Jan. 25, 1949.     V. W. MANTHEY     2,460,021
LOW CENTER OF GRAVITY SLEDS
Filed Sept. 19, 1946

INVENTOR.
Victor William Manthey
BY Victor J. Evans & Co.
ATTORNEYS

Patented Jan. 25, 1949

2,460,021

UNITED STATES PATENT OFFICE 2,460,021

LOW CENTER OF GRAVITY SLED

Victor William Manthey, Mauston, Wis.

Application September 19, 1946, Serial No. 698,010

1 Claim. (Cl. 280—12)

This invention relates to a low center of gravity sled, which is especially adapted to give greater security to the user thereof.

An object of this invention is to provide a sled that will give greater safety against lateral movement of the occupant thereof, and will also prevent the sled from tipping over.

Another object of the invention is to provide a sled that requires a minimum number of parts, can be inexpensively manufactured, and provides an attractive and pleasing appearance.

With the above and other objects in view, the invention consists of the novel details of construction, arrangement and combination of parts more fully hereinafter described, claimed and illustrated in the accompanying drawing in which:

Figure 1:
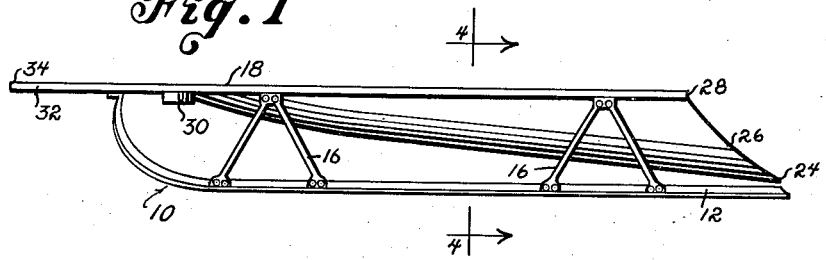
Figure 1 is a side view of an embodiment of the invention.
Figure 2:
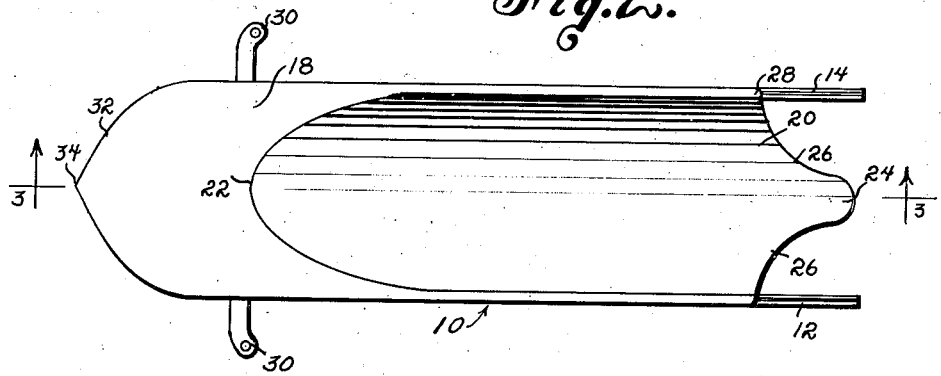
Figure 2 is a top plan view thereof.
Figure 3:
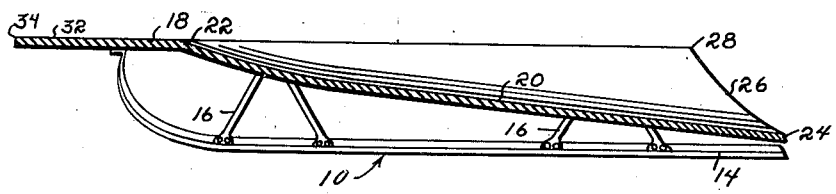
Figure 3 is a sectional view on the line 3—3 of Figure 2.
Figure 4:
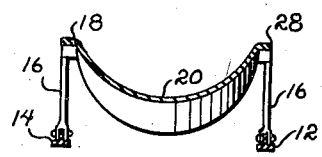
Figure 4 is a sectional view on the line 4—4 of Figure 1.

Referring more in detail to the drawing, the reference numeral 10 designates a sled which, constructed in accordance with the invention, is provided with the usual runners 12 and 14, which are supported in the usual manner by braces 16 secured to the top board 18 in the usual manner.

The outstanding feature of the invention is the concave recess 20 which is curved transversely of the sled, and increases its curvature gradually from a point 22 adjacent the front of the sled to end at the rear end of the sled which is provided with a reduced portion 24, having curved sides 26 merging with the upper edge of the top at 28.

The sled is also provided with the usual steering arm 30 and the front end of the top extends beyond the forward end of the runners to form a bumper portion 32 which tapers to a point at 34.

Thus a sled has been provided that has a low center of gravity and provides a recess in which the occupant lies when using the sled, and this recess provides more security to the user to prevent his rolling off of the sled, or the tilting of the sled when making turns.

It is believed that the construction and advantages of the invention will be apparent to those skilled in the art, and it is to be understood that changes in the details of construction, arrangement and combination of parts may be resorted to, provided they fall within the spirit of the invention and the scope of the appended claim.

Having thus described the invention, what is claimed as new and desired to be secured by Letters Patent is:

A sled of the character described, comprising a pair of runners, bracing members for said runners, a top board on said runners secured to said bracing members, the forward end of said top board extending beyond the front ends of said runners to form a bumper portion, a concave recess in said top board which is curved transversely of the top board and increases in curvature from a point adjacent the front of the top to the rear thereof and the rear end of the board having a reduced portion centrally thereof and the sides of the reduced portion being curved upwardly at the same inclination of the recess to conform to the legs of a rider of said sled.

VICTOR WILLIAM MANTHEY.

REFERENCES CITED

The following references are of record in the file of this patent:

UNITED STATES PATENTS

| Number | Name | Date |
|---|---|---|
| 88,457 | Bodisco | Mar. 30, 1869 |
| 2,188,080 | Grimm | Jan. 23, 1940 |
| 2,394,264 | Robinson | Feb. 5, 1946 |

FOREIGN PATENTS

| Number | Country | Date |
|---|---|---|
| 80,599 | Sweden | June 5, 1934 |
| 97,184 | Switzerland | Dec. 16, 1922 |
| 149,858 | Switzerland | Dec. 1, 1931 |